(12) United States Patent
Piasse et al.

(10) Patent No.: US 7,668,616 B2
(45) Date of Patent: Feb. 23, 2010

(54) METHOD OF RAPID HOLE TRANSFER TO REPLACEMENT PARTS

(75) Inventors: Michael L. Piasse, St. Charles, MO (US); Craig M. Farniok, Godfrey, IL (US); Richard J. Steckel, Wabington, MO (US); Orval M. Nobles, Ditmer, MO (US)

(73) Assignee: The Boeing Company, Chicago, IL (US)

( * ) Notice: Subject to any disclaimer, the term of this patent is extended or adjusted under 35 U.S.C. 154(b) by 208 days.

(21) Appl. No.: 11/752,353

(22) Filed: May 23, 2007

(65) Prior Publication Data

US 2008/0289163 A1  Nov. 27, 2008

(51) Int. Cl.
*G06F 19/00* (2006.01)
*B23P 19/04* (2006.01)
*B64F 5/00* (2006.01)

(52) U.S. Cl. .............. 700/160; 700/161; 29/402.08; 29/402.09

(58) Field of Classification Search .............. 700/160, 700/95, 161, 97; 29/402.08, 402.09
See application file for complete search history.

(56) References Cited

U.S. PATENT DOCUMENTS

| | | | |
|---|---|---|---|
| 2002/0166220 A1* | 11/2002 | Imundo et al. | 29/402.09 |
| 2005/0102050 A1* | 5/2005 | Richey | 700/97 |
| 2005/0147477 A1* | 7/2005 | Clark | 408/76 |
| 2006/0042068 A1* | 3/2006 | Whitworth et al. | 29/466 |
| 2006/0293906 A1* | 12/2006 | Wilson et al. | 705/1 |

OTHER PUBLICATIONS

Saadat et al. "Dimensional variations during Airbus wing assembly" Assembly Automation vol. 22 No. 3 2002, pp. 270-276.*
PCT ISR Dec. 9, 2008.
Boyer, "Digital Tooling for Major Structure Repair," IEEE AutotestCon Proceedings, Aug. 20, 2001, pp. 875-879.

* cited by examiner

*Primary Examiner*—Albert DeCady
*Assistant Examiner*—Steven R Garland
(74) *Attorney, Agent, or Firm*—Law Office of Charles W. Peterson, Jr.

(57) ABSTRACT

A method of replacing an existing part or parts on a structure such as an aircraft. The structure is inducted for modification. An existing part is removed and a new part is temporarily installed. Hole locations are digitally transferred to the new part, e.g., photographically captured in a three-dimensional coordinate measurement system, converted to targets printable in a laser projection system. Targets are laser projected or printed on the replacement part. Holes are drilled at each printed target. The holes drilled at printed targets match hole locations on the existing part. Then, the new/replacement part is permanently attached to the structure.

16 Claims, 5 Drawing Sheets

METHOD OF RAPID HOLE TRANSFER TO REPLACEMENT PARTS

BACKGROUND OF THE INVENTION

1. Field of the Invention

The present invention generally relates to aircraft maintenance and, more particularly, to providing "as built" hole locations on replacement parts for installation on aircraft.

2. Background Description

Vehicle (e.g., military and commercial aircraft) maintenance and repair may require replacing existing parts. Frequently, existing parts have been modified, e.g., for upgrading or retrofitting the vehicle with state of the art technology. Normally such modification is done individually on a vehicle by vehicle basis, e.g., during scheduled maintenance or routine repair. Also, final assembly or field repairs may have necessitated modifying the existing structure. Thus, the existing parts may vary with some variation of hole patterns and hole diameters from original equipment manufacturer (OEM) parts and, moreover, from vehicle to vehicle. Consequently, it is unlikely that replacement parts are pre-drilled to exactly match existing parts in the field and typically require custom drilling in existing parts and/or structure.

Thus, prior to/during installation, field service personnel must accurately reproduce hole patterns and diameters from the existing parts onto new replacement parts relative to the existing holes. Traditional prior art approaches (e.g., what is known as mate-drilling), frequently have been ineffective. Access restrictions can limit mate drilling, especially where existing holes are inaccessible and operator fatigue can provide less than satisfactory results, e.g., from missed holes or improper alignment. Finding satisfactory work-arounds or correcting errors can increase cycle time and reduce hole quality. Consequently, this has become a significant cost problem and a schedule driver, especially on large applications such as wing skin replacements.

Accordingly, there is a need for providing "as-built" replacement parts and, more particularly for accurately and rapidly collecting hole locations and centerlines and precisely transferring existing holes to new replacement parts for efficient field assembly.

SUMMARY OF THE INVENTION

An embodiment of the present invention includes a method of replacing an existing part or parts on a structure such as an aircraft. The structure is inducted for modification. An existing part is removed and a new part is temporarily installed. Hole locations are digitally transferred to the new part, e.g., photographically captured in a three-dimensional coordinate measurement system, converted to targets printable in a laser projection system. Targets are projected or printed on the replacement part. For example, the targets may be laser projected onto the surface of the part or printed onto laser imageable tape on the replacement part. Holes are drilled at each target. The holes drilled at targets match hole locations on the existing part. Then, the new/replacement part is permanently attached to the structure.

Advantageously, new replacement parts may be marked with precise locations captured as a digital definition of "as-built" holes on existing hardware, solving a common and widespread problem felt across the aircraft industry. Laser projection quickly and accurately projects hole feature targets, projected/printed on new parts, to efficiently mate new parts to existing needs. Furthermore, holes may be collected and transferred to a new piece outside of the aircraft to reduce labor costs. Even normally unavailable holes with little or no in place access can be accurately transferred to new parts prior to installation and the parts installed with all holes accurately reproduced on the new parts to reduce "Cost of Quality."

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
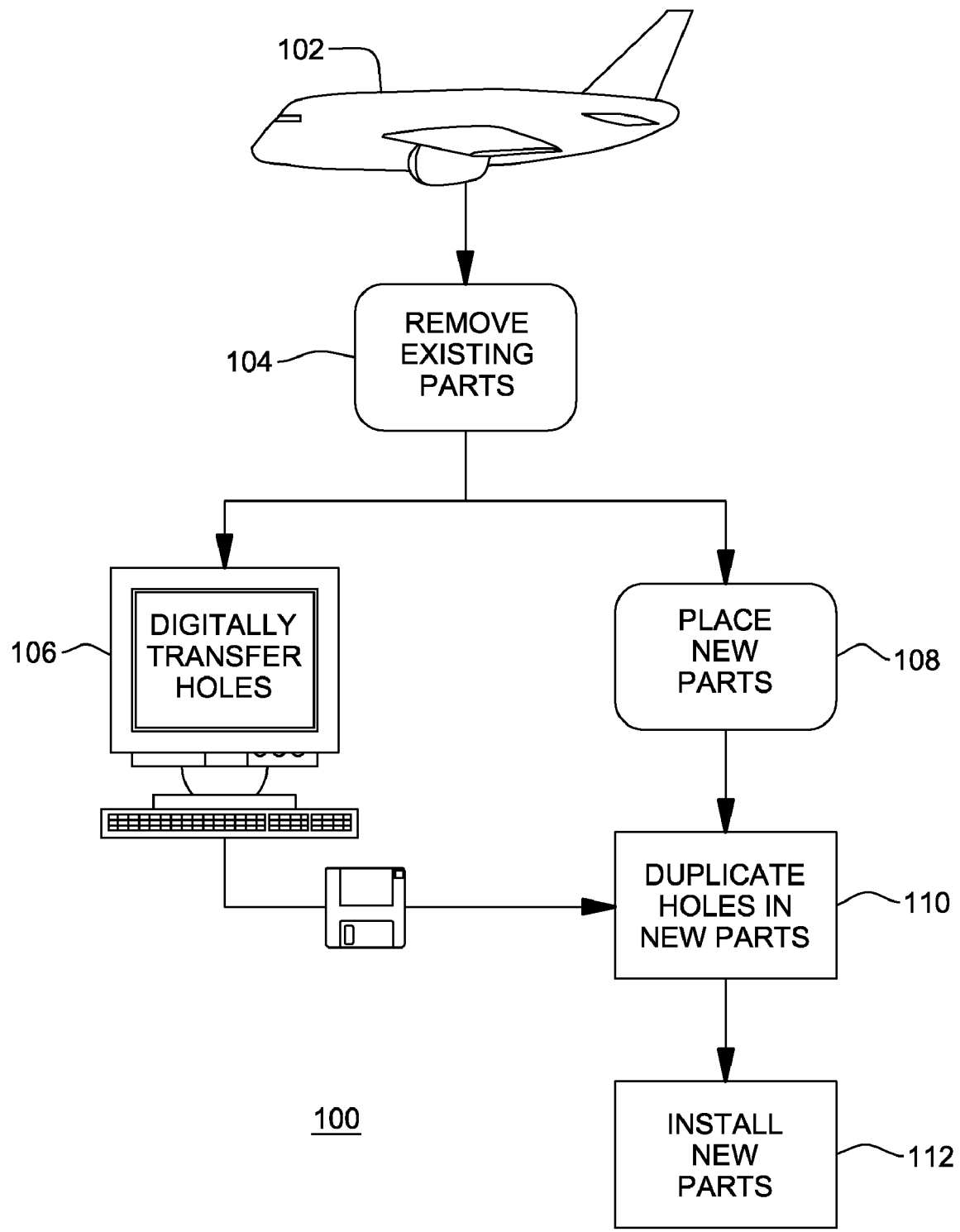
FIG. 1 shows a flow diagram example of providing replacement parts with precisely located holes that accurately match "as-built" hole locations and sizes according to an advantageous embodiment of the present invention.

Turning now to the drawings and more particularly, FIG. 1 shows a flow diagram example 100 of steps in providing replacement parts with precisely located holes that accurately match existing hole locations and sizes according to an advantageous embodiment of the present invention. Existing hole locations and dimensions are gathered, electronically with respective centerlines. The holes are mapped to targets on new replacement parts, projected/printed on the new replacement parts and then, transferred to the replacement parts for efficient field assembly. Since the holes on the replacement parts match holes on the existing part (the part being replaced), replacement is significantly streamlined. Notably, custom fitted replacements exactly match existing parts, even for large applications such as wing skin replacements.

It should be noted that although the invention is described herein with respect to replacing parts on aircraft, this is for example only and not intended as a limitation. The present invention has application to facilitating replacing existing parts on any vehicle or structure.

Replacement begins in step 102 as an aircraft is inducted for modification. In step 104 parts identified for replacement are removed from the identified aircraft. Digital hole transfer begins in step 106 and in step 108, new parts (e.g., blank or virgin parts without holes) are temporarily installed. This may occur substantially coincident or sequentially with step 106 following or preceding step 108. In step 110, digital hole transfer results are retrieved and targets are produced. Holes are opened at the indicated locations using standard shop practices, e.g., drilling. Finally, in step 112 new parts are permanently installed in the aircraft, e.g., a part is bolted in place.

In digital hole transfer step 106 "as-built" (existing) hole locations or other features are captured using double vector targets in a three-dimensional coordinate measurement system, preferably, in what is known as Photogrammetry. Photogrammetry uses triangulation principles to determine feature coordinates from photographs taken at two or more locations. Double vector targets are placed at each hole location of the previously removed (in step 104) existing part. The double vector targets also facilitate determining the centerline orientation of each hole. In addition to placing the double vector targets, a selected minimum, e.g., six (6), self adhesive reference targets are placed on the periphery of the part. These reference targets provide laser projector alignment targets, for subsequently realigning to maintain the same local coordinate system throughout.

Figure 2:
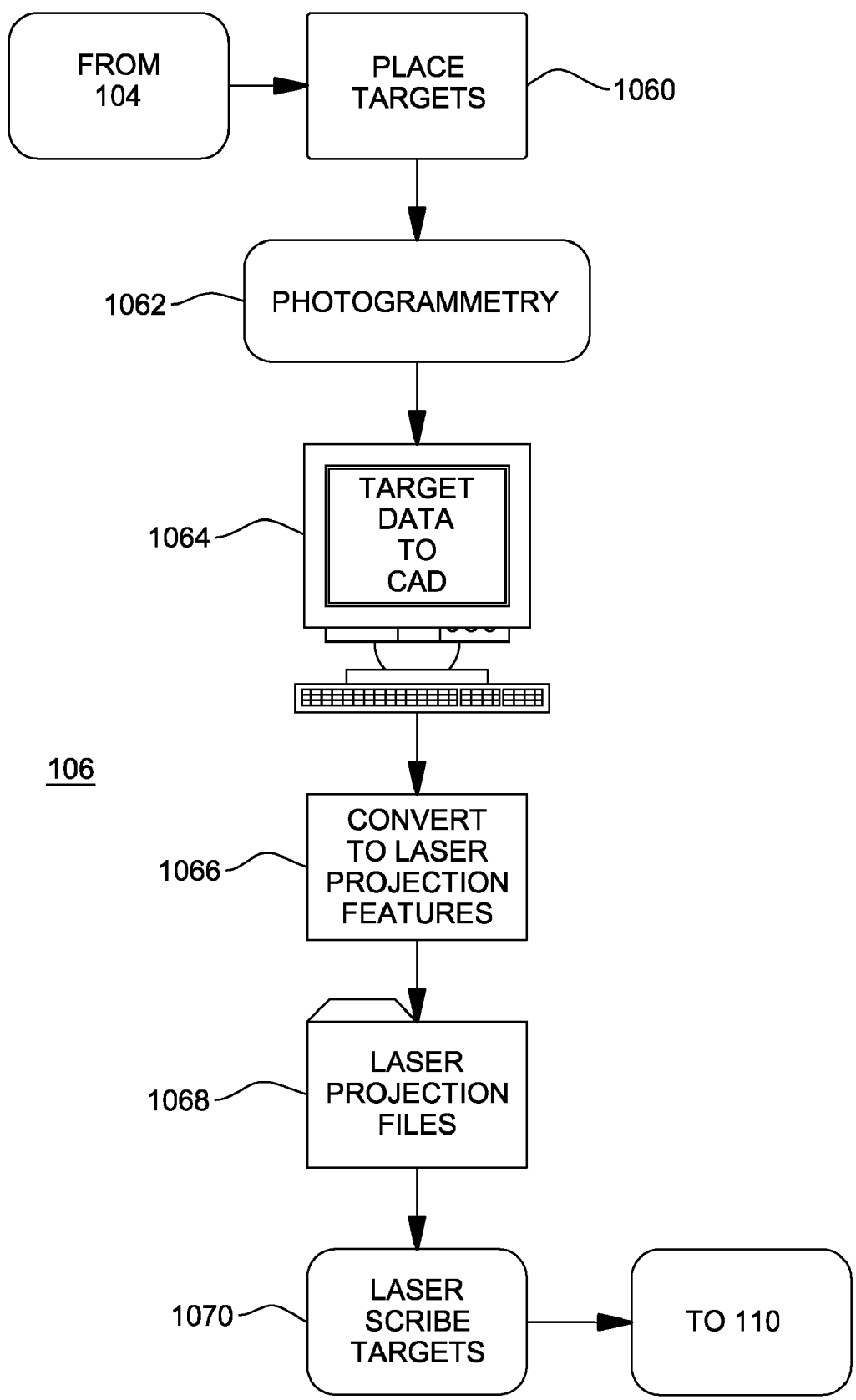
FIG. 2 shows a flow diagram example of digital hole transfer step in more detail.

FIG. 2 shows a flow diagram example of digital hole transfer step 106 in more detail. First, in step 1060, double vector targets are fixed to the previously removed part. Then, Photogrammetry begins in step 1062 by photographing the piece. Next, in step 1064 the collected coordinates are exported to a computer added design (CAD) tool. In step 1066, the CAD tool converts the coordinates into a suitable format for controlling the laser projection system in reproducing the imaged target locations. Preferably, the results are stored in laser projection files. In step 1068 the laser projection files are passed to the laser projection system. In step 1070, the laser projects/prints targets at the locations on the new part based on the laser projection files. Once the hole locations are marked, e.g., as cross hairs on the new part, the holes are reproduced with standard shop practices, e.g., drilled and tapped.

Figure 3A:
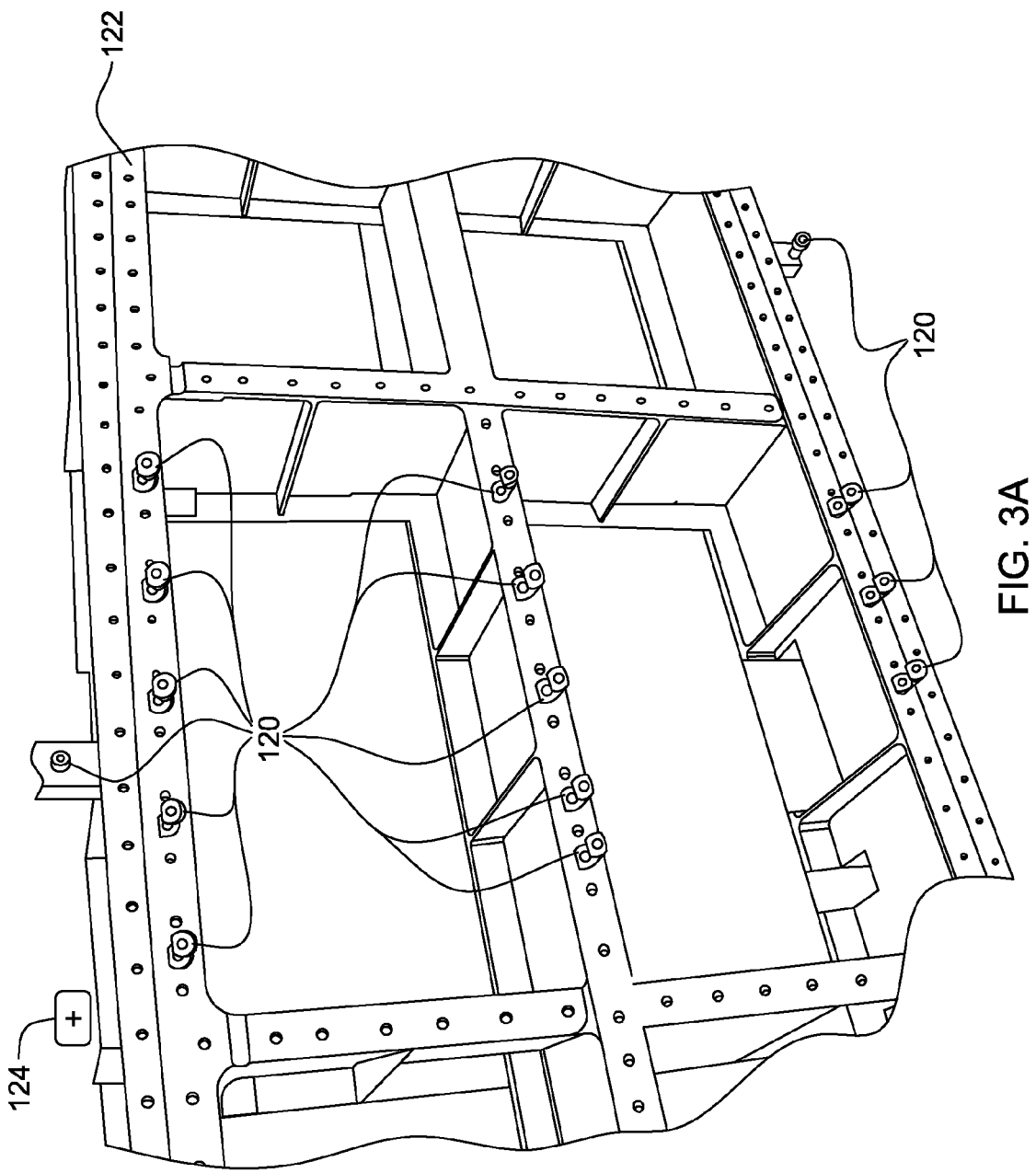
FIG. 3A shows an example of inserting the double vector targets to identify those existing holes for transfer.
Figure 3B:
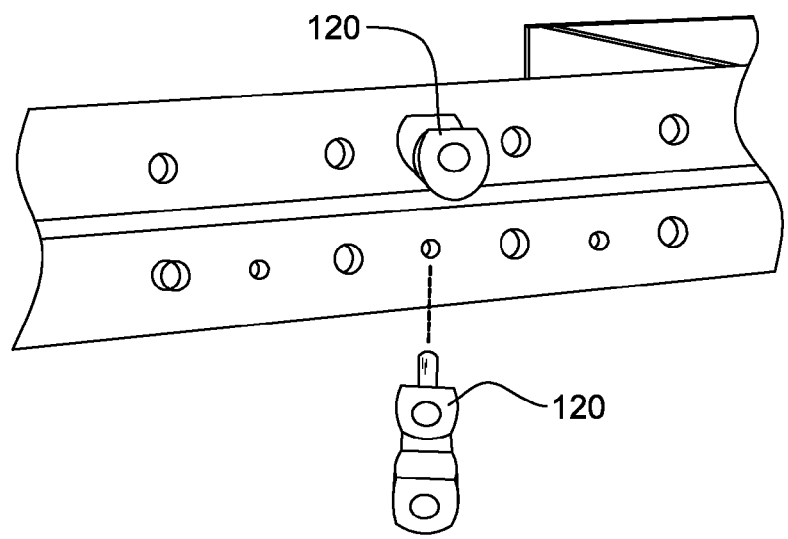
FIG. 3B shows an expanded example of an inserted double vector target.

FIG. 3A shows an example of double vector targets 120 inserted (e.g., step 1060 of FIG. 2) to identify those existing holes to be transferred from an existing part 122 (e.g., a section of frame) to a replacement part (not shown). FIG. 3B shows an expanded example of a double vector target 120 inserted in existing part 122. The replacement part may be, for example, a new section of frame or aircraft skin to be applied to the section 122. Also, a selected minimum (e.g., 6) of self adhesive alignment targets 124 are placed on the periphery in the immediate vicinity of the existing part. With the double vector targets 120 and alignment targets 124 in place the existing part is photographed (one or, preferably, multiple times) in Photogrammetry step 1062 of FIG. 2.

Figure 4:
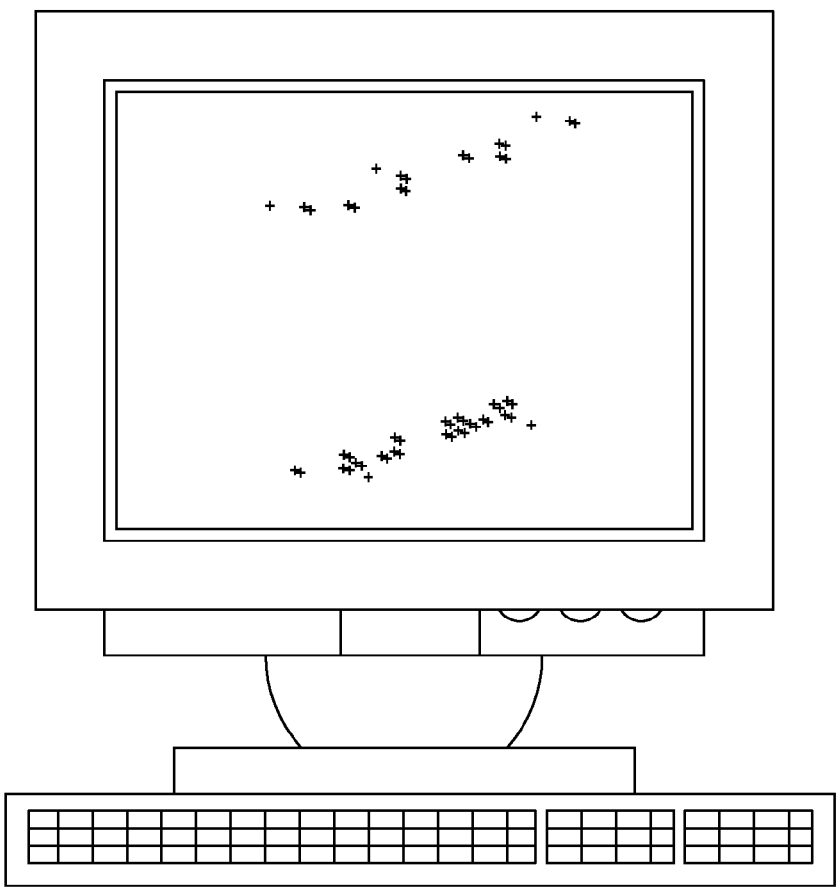
FIG. 4 shows an example of collected target locations that are passed to the CAD tool for processing

Coordinates, shown by the displayed points in the example of FIG. 4, pf target hole 122 locations are collected/extracted from the photographs. The collected values of the locations are passed to the CAD tool for processing in step 1064 of FIG. 2. Preferably, the CAD tool is a suitable three dimensional (3D) CAD system or, a suitable software application operating on a suitably equipped computer, that processes the collected coordinates, to build projection and alignment entities in step 1066. Preferably, the CAD tool converts the coordinates into a format suitable for controlling a laser projection system. The coordinates from the double vector targets are offset or mapped to the new part surface as a crosshair or other CAD entity. Preferably, the crosshair is created normal to the new part surface at each hole location. Preferably also, the CAD maintains the peripheral alignment targets as single points.

The laser projection files are passed to or, imported into, the laser projection system in step 1068 for reproducing the imaged target locations. This transfer may be automatic or manual. Where the CAD system and the laser projection system are included in the same system, for example, the CAD/laser system preprocesses the target locations and controls the laser. Alternately, the laser projection files data is generated on a separate CAD system and transferred, electronically (e.g., over a wired network or wirelessly over a WiFi network) or manually, e.g., in a USB flash drive, on CDROM, DVDROM, a floppy disk or any other suitable medium.

Figure 5A:
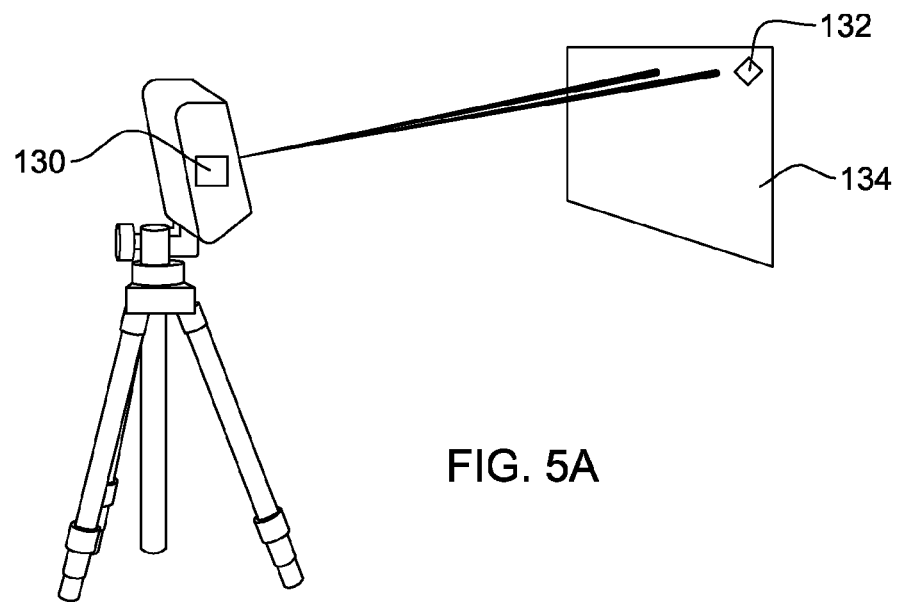
FIGS. 5A-B show an example of printing the locations by a laser under program control.
Figure 5B:
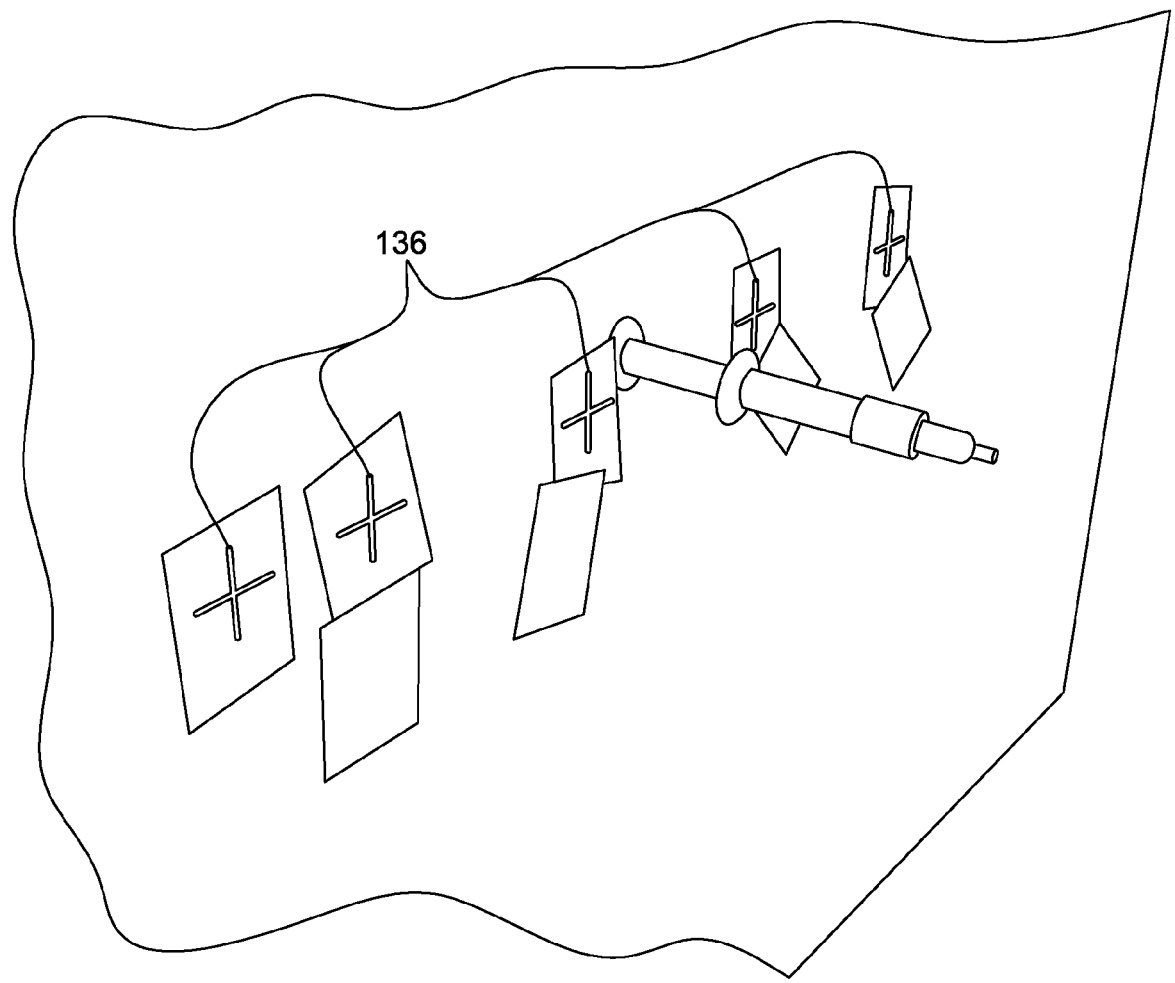

FIGS. 5A-B show an example of a laser projecting the locations in step 1070 of FIG. 2, e.g., under program control. As shown in FIG. 5A, the laser projection system 130 scans alignment points 132 on the periphery of the new part 134 to "best fit" align the projector to the targets on the aircraft. FIG. 5B shows crosshairs 136 or other entities projected onto the part 134 surface in the correct location or orientation. Preferably, the laser images each location target on photo sensitive tape, e.g., fixed to the temporarily installed new piece 134. Fixing the locations onto photo sensitive tape makes hole production independent of laser projector.

Advantageously, new replacement parts may be marked with precise locations captured as a digital definition of "as-built" holes on existing hardware, solving a common and widespread problem felt across the aircraft industry. Laser projection quickly and accurately projects hole feature targets, projected/printed on new parts, to efficiently mate new parts to existing needs. Furthermore, holes may be collected and transferred to a new piece outside of the aircraft to reduce labor costs. Even normally unavailable holes with little or no in place access can be accurately transferred to new parts prior to installation and the parts installed with all holes accurately reproduced on the new parts to reduce "Cost of Quality."

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A method of replacing existing parts, said method comprising the steps of:
   a) inducting a structure for modification;
   b) removing parts identified for replacement;
   c) locating replacement parts in place of removed said parts;
   d) photogrammetrically determining hole coordinates for hole locations on said removed parts in a three-dimensional coordinate measurement system, wherein capturing said hole locations comprises:
      i) locating double vector targets in each existing hole location on a removed part,
      ii) photographing said removed part, and
      iii) processing each photograph using photogrammetry, hole coordinates and centerline orientation being provided for each double vector target;
   e) locating corresponding hole coordinates on respective replacement parts; and
   f) fixing said replacement parts in place, digitally transferred hole locations matching hole locations on said removed parts.

2. A method as in claim 1, wherein the step (i) of locating double vector targets further comprises peripherally locating alignment targets at said removed part.

3. A method as in claim 1, further comprising converting provided said hole coordinates to features printable in a laser projection system.

4. A method as in claim 3, wherein the step (e) of locating corresponding hole coordinates further comprises printing said features at corresponding locations on a respective replacement part.

5. A method as in claim 4, wherein the step (f) of fixing said replacement parts in place comprises:
   i) drilling a hole at each printed feature; and
   ii) permanently attaching said respective replacement part at ones of the drilled holes.

6. A method as in claim 5, wherein said structure is an aircraft and at least one of said replacement parts is a skin section being bolted in place on said aircraft at said holes.

7. A method of replacing an existing aircraft part, said method comprising the steps of:
   a) inducting an aircraft for modification;
   b) removing an existing aircraft part identified for replacement;
   c) photogrammetrically capturing hole locations in a three-dimensional coordinate measurement system, wherein photogrammetrically capturing said hole locations comprises:
      i) locating double vector targets in each existing hole location on said existing aircraft part,
      ii) photographing said existing aircraft part, and
      iii) processing each photograph using photogrammetry, hole coordinates and centerline orientation being provided for each double vector target;
   d) locating a replacement part in place of the removed said existing aircraft part;
   e) digitally transferring captured said hole locations to said replacement part; and
   f) attaching said replacement part to said aircraft, digitally transferred hole locations matching hole locations on said existing aircraft part.

8. A method as in claim 7, wherein the step (i) of locating double vector targets further comprises peripherally locating alignment targets at said removed part.

9. A method as in claim 7, wherein the step (e) of digitally transferring captured said hole locations comprises converting captured said hole locations to features printable in a laser projection system.

10. A method as in claim 9, wherein the step (e) of digitally transferring further comprises printing said feature targets identifying corresponding locations on said replacement part.

11. A method as in claim 10, wherein said feature targets are crosshairs printed on photosensitive tape at corresponding locations on said replacement part.

12. A method as in claim 7, wherein the step (f) of attaching said replacement part comprises:
   i) drilling a hole at each hole location; and
   ii) permanently attaching said replacement part at ones of the drilled holes.

13. A method as in claim 7, wherein said replacement part is a skin section being bolted in place on said aircraft at said holes.

14. A method of replacing an existing aircraft part, said method comprising the steps of:
   a) inducting an aircraft for modification;
   b) removing an aircraft part identified for replacement;
   c) photographically capturing hole locations from said aircraft part, said hole locations being captured in a three-dimensional coordinate measurement system, wherein the step (c) of capturing said hole locations comprises:
      i) locating double vector targets in each existing hole location on said aircraft part,
      ii) peripherally locating alignment targets at said aircraft part,
      iii) photographing said aircraft part, and
      iv) Photogrammetry processing each photograph, hole coordinates being provided for each double vector target;
   d) locating a replacement part in place of the removed said aircraft part;
   e) converting captured said hole locations to feature targets printable in a laser projection system;
   f) laser printing said feature targets on said replacement part;
   g) drilling a hole at each printed target; and
   h) permanently attaching said replacement part to said aircraft, holes at printed targets on said replacement part matching hole locations on said aircraft part.

15. A method as in claim 14, wherein permanently attaching said replacement part comprises permanently attaching said replacement part at ones of the drilled holes.

16. A method as in claim 14, wherein said targets are crosshairs printed on photosensitive tape at corresponding locations on said replacement part and said replacement part is a skin section being bolted in place on said aircraft at said holes.

* * * * *